Sept. 5, 1967  H. L. SEIDEN  3,339,425
SELF-VARYING GOVERNOR
Filed June 1, 1965  2 Sheets-Sheet 1

INVENTOR.
Herman L. Seiden
BY
ATTORNEY.

Sept. 5, 1967          H. L. SEIDEN          3,339,425

SELF-VARYING GOVERNOR

Filed June 1, 1965

INVENTOR.
Herman L. Seiden

United States Patent Office 3,339,425
Patented Sept. 5, 1967

3,339,425
SELF-VARYING GOVERNOR
Herman L. Seiden, Chicago, Ill., assignor, by mesne assignments, to Lion Manufacturing Corporation, Chicago, Ill., a corporation of Illinois
Filed June 1, 1965, Ser. No. 460,394
6 Claims. (Cl. 74—393)

ABSTRACT OF THE DISCLOSURE

A driving shaft which is to be governed is coupled through a gear train with an output gear driving a loading device such as a fan; and a variable-ratio gear means in the gear train, for example, an eccentric gear and follower, varies the ratio and hence the loading effect. Supplement to the subject: the gear train includes a clutch means which can decouple the loading means from the driving shaft in case of overload and/or reversal.

---

This invention provides a self-varying governor means in the form of a compact gear train system adapted for connection to a driven shaft to which a variable governor load is intended to be connected for the purpose of preventing the shaft from maintaining a steady rate of speed in response to a driving torque applied thereto.

Some of the more particular features of novelty and utility characterizing the device relate to the provision of a gear train including a rotatable governor loading device and a train of gears connecting the same to a driven shaft, together with intermediate gear means including an eccentric gear and follower gear means for varying the gear ratio continuously as the loading device is rotated, together with a further intermediate gear means including an overload clutch operable to disconnect the driven shaft from the loading device when the applied driving torque exceeds a desired limit.

Other objects of novelty and utility relate to details of the construction and operation of the illustrative embodiment described hereinafter in view of the annexed drawings, in which.

Figure 1:
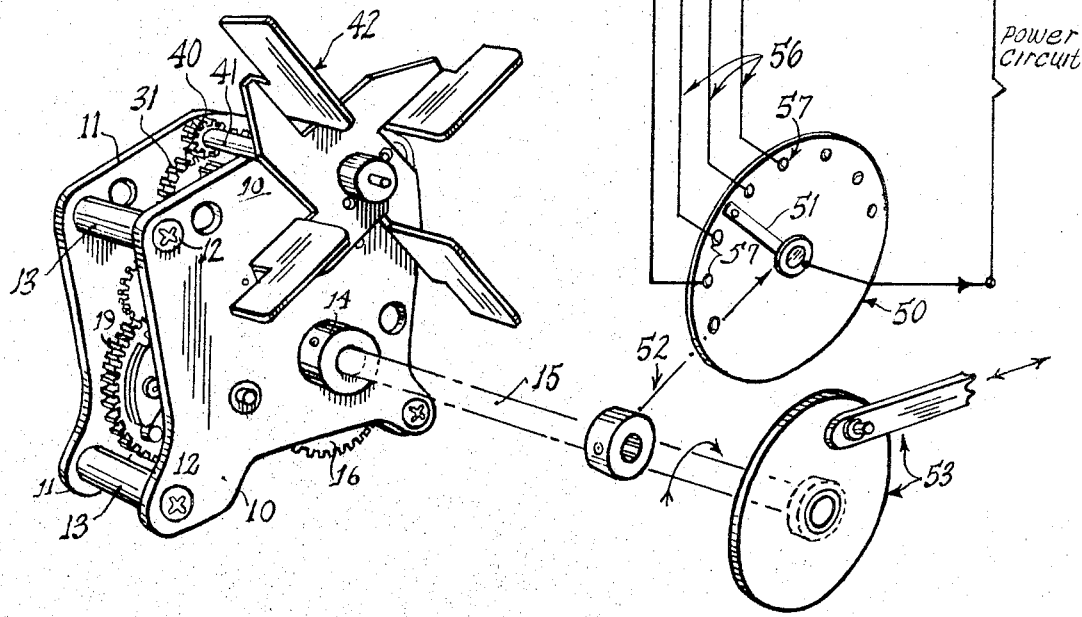
FIGURE 1 is a perspective view of the governor device in conjunction with a schematically illustrated utilization means.

As viewed in FIGURE 1, the compact governor unit comprises a pair of chassis plates 10 and 11 joined in spaced relation by screws 12 and tubular spacers 13.

Figure 2:
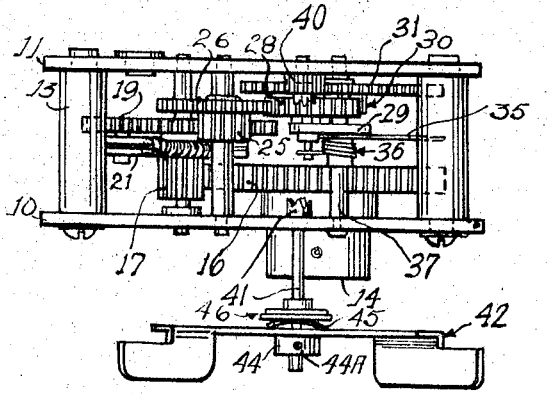
FIGURE 2 is a top plan view of the governor with parts being broken away.
Figure 3:
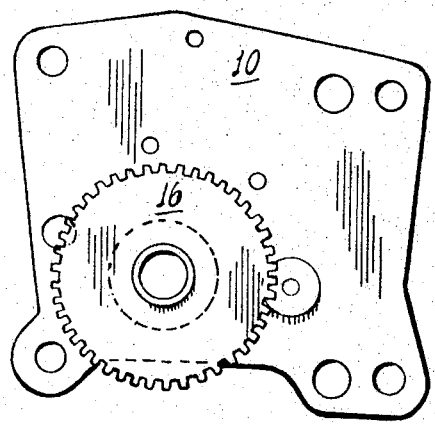
FIGURE 3 is an elevational view of the inside face of one of the chassis plates showing the bull gear.
Figure 4:
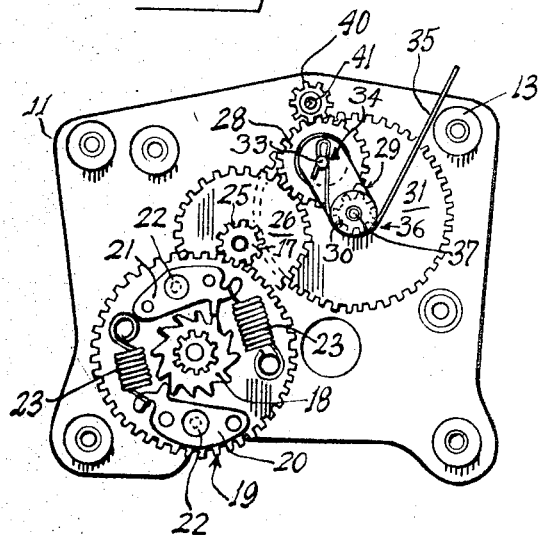
FIGURE 4 is an inside elevational view of the companion chassis plate showing the remainder of the gear train.
Figure 5:
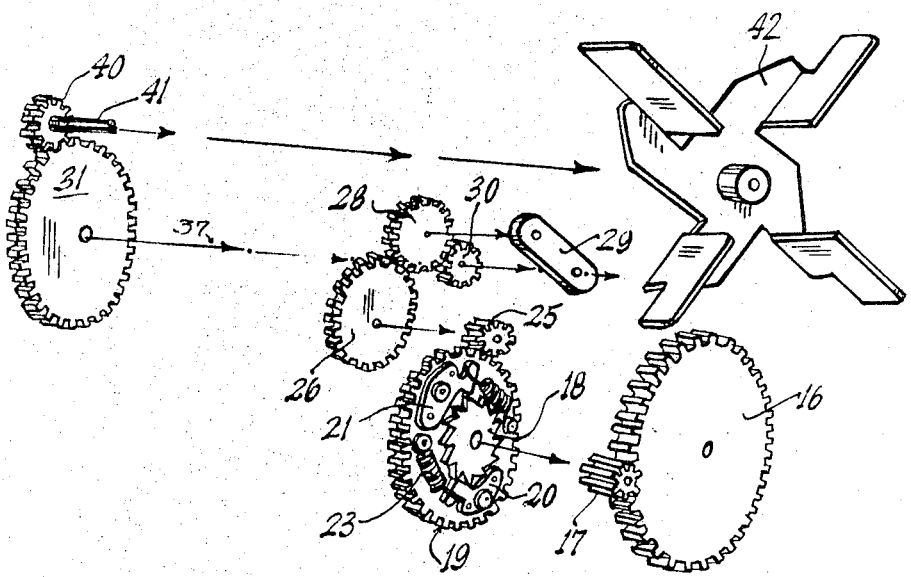
FIGURE 5 is an exploded perspective of the gear system and loading means.

At a lower portion of the chassis plate 10 is a coupling collar 14 adapted for connection with a driven shaft 15, said collar being fast on the inside of plate 10, as in FIGURE 3, with a bull gear 16 adapted to mesh with a clutch pinion 17, as seen in FIGURES 2, 4 and 5, said pinion driving a ratchet wheel 18, FIGURES 4 and 5, freely rotatable concentrically with a large clutch gear 19 on the inside face of which are carried two ratchet dogs 20 and 21 respectively rockable on pivots 22 and urged into coupling engagement with the ratchet wheel by springs 23.

The ratchet gear 19 engages the pinion 25, FIGURES 4 and 5 particularly, of an eccentric gear 26, which in turn is drivingly engaged by a follower coupling gear 28 carried on a rocker arm 29, FIGURES 4 and 5, rotatable concentrically with a driven output pinion 30 fast with a large output gear 31 on the same axis of rotation.

As seen in FIGURES 2 and 4, the follower gear is carried at the end of the rocker arm on a small stud shaft 33, which is engaged and secured in place by the hooked end 34 of a wire spring 35 having convolutions 36, FIGURE 2, coiled about the shaft 37 which provides the pivot for the rocker arm and the output gears, said spring having a free end portion bearing against one of the tubular spacers 13 whereby the rocker shaft, as viewed in FIGURE 4, is urged in counter-clockwise direction into driving engagement with the periphery of the eccentric gear to follow the radial variations of the latter in the course of its rotation.

The large output gear 31, FIGURES 1, 4 and 5, meshes with a pinion 40 driving the shaft 41 of a rotatable loading device, which in its simplest form may be a small paddle type fan 42.

The operation of the device is illustrated in FIGURE 1 in conjunction with a rotary switch means 50 including a rotatable contactor 51 having a driving connection 52 with the shaft 15, the latter being driven by a crank means 53 which may be assumed to be rotated by any driving source, and particularly one which is likely itself to supply a varied driving force to the shaft 15. For instance, the crank means 53 might be manually actuated so that different degrees of driving force would be expected to be applied thereto from time to time, possibly in both clockwise and counter-clockwise directions, it being unimportant however to the functioning of the disclosed device what the source of driving torque applied to the shaft 15 may be.

The shaft means 50 is illustrated as controlling a plurality of lamps 55 respectively connecting through conductors 56 with contacts 57 on the rotary switch in such manner that the rotary contactor 51 will progressively illuminate and extinguish the lamps at a rate of the speed of rotation of the shaft 15, it being the function of the governor device in such an application to change the rate of the shaft 15 and therefore of the rotary switch means 50 so that the flashing of the lamps 55 will be varied.

In the event that a reverse effort is applied to the shaft 15, in this instance in a counter-clockwise direction, the ratchet clutch means 18, 20, etc., will release and the shaft will transmit no reverse torque to the governor unit.

The fan type loading means is preferably impositively connected with the shaft 41 to slip if the fan is impeded, this being accomplished by securing the fan hub 44 by set screws 44A to shaft 41, while allowing the fan to turn freely on the hub, a slip clutch means in the form of a spring presser washer 45, a retaining washer 46, and a spring hairpin retainer engaging the neck of the hub, serving to press the fan against the hub to rotate therewith under normal conditions. The presser washer 45 will allow slippage between the hub and fan if the latter is jammed or restrained, or if the shaft 41 is forced to turn so rapidly that the inertia of the fan exceeds the frictional grab of the spring presser washer.

The ratchet clutch means 18, 20, 21, 23 is highly effective but may be replaced by other forms of compact unidirectional clutch of the known roller or spring types.

I claim:
1. A self-varying governor unit comprising a train of gears having an input connection for coupling same with a rotatable shaft to be governed and an output gear driving a rotatable loading device, together with an intermediately driven eccentric gear and follower gear means drivingly interposed in the train between said input and output gears, whereby the loading effect of said loading device is applied to said shaft in accordance with a variable ratio effect produced by rotation of said eccentric gear responsive to rotation of the rotatable shaft.

2. The device of cliam 1 in which said gear train includes a unidirectional clutch gear drivingly interposed between said shaft and said eccentric gear in such manner as to drivingly disconnect the shaft from the effect of the loading means when a reverse torque is applied to said shaft.

3. Apparatus according to claim 1 in which said loading means is in the form of a rotatable fan means driven from said output gear.

4. In a gear type governor mechanism, a bull gear adapted to be driven in step with a controlled shaft; an output gear, a loading device driven from said output gear, and intermediate gear means coacting with said bull gear and said output gear and transmitting power from one to the other thereof and including a pair of gears in mutually interdriving relationship and having an eccentric change-ratio character such that the loading effect of said loading device is variantly reflected to said shaft as a function of rotation of the bull gear and the intermediate gear means.

5. In a gear mechanism a gear train comprising an input gear adapted for driving connection with a controlled shaft; an output gear means; a rotatable loading device drivingly interconnecting with said output gear means; and further gear means in said train and drivingly interconnecting said input gear and said output gear means and including an eccentric gear and a follower gear rotatively meshing therewith, said follower gear being rotatively supported on a rocker arm spring-urged to hold the follower gear in driving intermesh with the eccentric gear throughout each rotative cycle of the latter, said rocker arm being movable concentrically with the axis of rotation of said output gear means.

6. In a variable-ratio governor device of the type having a drive gear, a train of driven gears driven by the drive gear, and governor loading means driven from said gear train, means for causing the loading reflected to said drive gear to be varied as a function of rotation of the drive gear in at least one direction, said means comprising, the combination, with an intermediate gear in said gear train, of a change-ratio gear rotated about the axis of, and in step with, said intermediate gear but eccentrically of said axis, a rocker arm mounted at an end coaxially with another gear in said train for movement of an opposite end thereof radially toward and from the path of the gear teeth of said change-ratio gear; a follower coupling gear journalled at said opposite end of the rocker arm to mesh with the teeth of the change-ratio gear; spring means urging the follower gear into constant following mesh with the teeth of the change-ratio gear; and further gear means drivingly interconnecting the loading means with said follower gear.

References Cited

UNITED STATES PATENTS

| 1,807,889 | 6/1931 | Belin | 74—393 |
| 1,975,126 | 10/1934 | Scholin | 74—394 |
| 2,655,817 | 10/1953 | Armelin | 74—394 |
| 3,076,351 | 2/1963 | Moss | 74—394 |

FOREIGN PATENTS 325,996   3/1930   Great Britain.

DONLEY J. STOCKING, *Primary Examiner.*

DAVID J. WILLIAMOWSKY, *Examiner.*

L. H. GERIN, *Assistant Examiner.*

UNITED STATES PATENT OFFICE
CERTIFICATE OF CORRECTION

Patent No. 3,339,425　　　　　　　　　　　　September 5, 1967

Herman L. Seiden

It is certified that error appears in the above identified patent and that said Letters Patent are hereby corrected as shown below:

In the drawings, Sheet 2, Fig. 2, the reference numeral 33 should be applied to the small stud shaft; and reference numeral 47 should be applied to the spring hairpin retainer washer. Column 2, line 33, "shaft" should read -- switch --; line 49, after "44" insert -- , Figure 2, --; line 53, after "retainer" insert -- washer or the like 47 --.

Signed and sealed this 5th day of May 1970.

(SEAL)
Attest:

Edward M. Fletcher, Jr.　　　　　　　　　　WILLIAM E. SCHUYLER, JR.
Attesting Officer　　　　　　　　　　　　　Commissioner of Patents